(12) United States Patent
Hawkins et al.

(10) Patent No.: US 6,904,352 B2
(45) Date of Patent: Jun. 7, 2005

(54) METHOD OF ESTIMATING ENGINE COOLING FAN POWER LOSSES

(75) Inventors: Jeffery S. Hawkins, Farmington Hills, MI (US); Richard M. Avery, Jr., West Bloomfield, MI (US); Leopold Super, Dearborn, MI (US)

(73) Assignee: Detroit Diesel Corporation, Detroit, MI (US)

( * ) Notice: Subject to any disclaimer, the term of this patent is extended or adjusted under 35 U.S.C. 154(b) by 71 days.

(21) Appl. No.: 10/674,008

(22) Filed: Sep. 29, 2003

(65) Prior Publication Data

US 2005/0066715 A1 Mar. 31, 2005

(51) Int. Cl.$^7$ ................................. B60T 7/12
(52) U.S. Cl. ....................... 701/101; 701/114
(58) Field of Search ................ 701/101, 114, 701/115

(56) References Cited

U.S. PATENT DOCUMENTS

| | | | | |
|---|---|---|---|---|
| 5,780,731 A | * | 7/1998 | Matsui et al. | 73/118.1 |
| 6,584,391 B2 | * | 6/2003 | Lack | 701/51 |
| 6,654,678 B1 | * | 11/2003 | Rodriguez | 701/104 |
| 2002/0062183 A1 | * | 5/2002 | Yamaguchi et al. | 701/22 |
| 2002/0166330 A1 | | 11/2002 | Matsubara et al. | |
| 2003/0017911 A1 | | 1/2003 | Lack | |

* cited by examiner

Primary Examiner—John T. Kwon
(74) Attorney, Agent, or Firm—Brooks Kushman P.C.

(57) ABSTRACT

A method for estimating engine torque loss due to a fan. A table of maximum fan torque losses is compiled at a plurality of engine speeds. An engine control unit (ECU) is configured with the table of maximum fan torque losses. A first maximum fan torque loss and a second maximum fan torque loss for an engine speed are retrieved from the table. A maximum fan torque loss for the engine speed is estimated by interpolating between the first maximum fan torque loss and the second maximum fan torque loss. An engine torque loss estimate is calculated by adjusting the maximum fan torque loss based on a set of predetermined fan characteristics.

12 Claims, 4 Drawing Sheets

METHOD OF ESTIMATING ENGINE COOLING FAN POWER LOSSES

BACKGROUND OF THE INVENTION

1. Field of the Invention

The present invention relates to a method of engine control and, more particularly, to a method and system for estimating engine cooling fan power losses.

2. Background Art

In the control of heavy duty internal combustion engines, conventional practices utilize electronic control units having volatile and non-volatile memory, input and output driver circuitry, and a processor that executes instructions to control the engine and its various systems and subsystems. The electronic control units communicate with numerous sensors, actuators, and other electronic control units to control various functions such as various aspects of field delivery, transmission control, and engine control. Typically, one of the electronic control units operates to control engine cooling fans in accordance with received fan request signals. Although many types of fans are used with internal combustion engines, the control schemes used to control the fans are simple and the control algorithms are conservative to reduce the possibility of overheating and engine component failure.

At the same time, the heavy duty engine business is extremely competitive. Greater demands are being placed on engine manufacturers to design and build engines that provide better engine performance, improved reliability, and greater durability while meeting more stringent emission and noise requirements. One of the greatest customer demands is to provide more fuel efficient engines. With increasing fuel costs, demands for fuel efficiency are becoming so great that all vehicle components and accessories are being scrutinized in attempts to reduce power consumption. The engine fan represents a significant load on an engine, reducing available power and torque when the fan is operating.

For the foregoing reasons, it would be desirable to have an improved method of estimating engine power losses due to the cooling fan and allowing for more aggressive fan control to improve vehicle fuel efficiency. Additionally, transmissions require more accurate information concerning actual power available to them at the engine flywheel (i.e., the power input to the transmission).

SUMMARY OF THE INVENTION

One aspect of the method of estimating engine cooling fan power losses of the present invention is to provide a more accurate method of estimating the cooling fan parasitics on an engine at a given moment in time. Supplying more accurate inputs to an engine controller control algorithm sets the stage for more aggressive control algorithms to be applied, thus further improving fuel economy. More accurate information may be supplied to the transmission concerning actual power available to the transmission at the engine flywheel.

The method of estimating engine torque loss due to a fan comprises a plurality of steps. A table of maximum fan torque losses at a plurality of engine speeds is compiled and an engine control unit (ECU) is configured with this table. A first maximum fan torque loss and a second maximum fan torque loss closest to an engine speed are retrieved from the table. The ECU interpolates between the first maximum fan torque loss and the second maximum fan torque loss to estimate the maximum fan torque loss for the current engine speed. Engine torque loss is estimated by adjusting the maximum fan torque loss based on a set of predetermined fan characteristics.

The predetermined fan characteristics may include the steps of determining if the fan is a single speed fan and determining if the fan is operating. The engine torque loss estimate is set at zero if the fan is not operating. The engine torque loss estimate is set at the maximum fan torque loss if the fan is a single speed fan and is in operation.

Next, it is determined if the fan is a two speed fan and the operating speed of the fan is ascertained. The engine torque loss estimate is set at zero if the fan is not operating. The engine torque loss estimate is set by multiplying the maximum fan torque loss by a speed scale factor if the fan is a two speed fan operating at low speed. The engine torque loss estimate is set at the maximum fan torque loss if the fan is a two speed fan operating at high speed.

Subsequently, it is determined if the fan is a dual fan and how many fans are operating. The engine torque loss estimate is set at zero if both fans are not operating. The engine torque loss estimate is set by multiplying the maximum fan torque loss by an adjustable scale factor (e.g., 0.5) if the fan type is a dual fan and only one fan is operating. The engine torque loss estimate is set at the maximum fan torque loss if the fan is a dual fan with both fans operating.

Next, it is determined whether the fan is a variable speed fan and if the fan is operating at or above a maximum duty cycle. The engine torque loss estimate is set at zero if the fan is not operating. The maximum fan torque loss is multiplied by a ratio of an actual fan duty cycle compared to the maximum fan duty cycle if the fan type is a variable fan and the fan is operating at less than the maximum duty cycle. The engine torque loss estimate is set at the maximum fan torque loss if the fan is a variable speed fan operating at or above the maximum duty cycle. In one example, the maximum duty cycle may be configured to be 50%.

The engine torque loss estimate may be reported on a digital communication link in a vehicle. The engine control unit may optimally adjust the operation of the fan according to operating conditions of the engine and the engine torque loss estimate.

In another aspect of the present invention, a system for estimating engine torque loss due to a fan is provided. The system includes an engine control unit (ECU), a digital communication link connected to the engine control unit, and a fan connected to the digital communication link. The ECU calculates a maximum fan torque loss by interpolating between a plurality of maximum fan torque loss values based on engine speeds stored in a table in the ECU. The maximum fan torque loss is adjusted to obtain an engine torque loss estimate based on a set of predetermined fan characteristics. The set of predetermined fan characteristics may include whether the fan is a single speed fan, a two speed fan, a variable speed fan, or a dual fan. Alternatively, the set of predetermined fan characteristics may include the type of fan used and the operating speed of the fan. In one example, the digital communication link may be a SAE J1939 digital communication link.

These and other aspects of the present invention will be better understood in view of the attached drawings and detailed description of the system provided below.

DETAILED DESCRIPTION OF THE PREFERRED EMBODIMENT(S)

Several engine manufacturers broadcast estimates of the engine torque loss due to the engine fan on digital communication links. It is advantageous to ensure that this parasitic is reported as accurately as possible.

Figure 1:
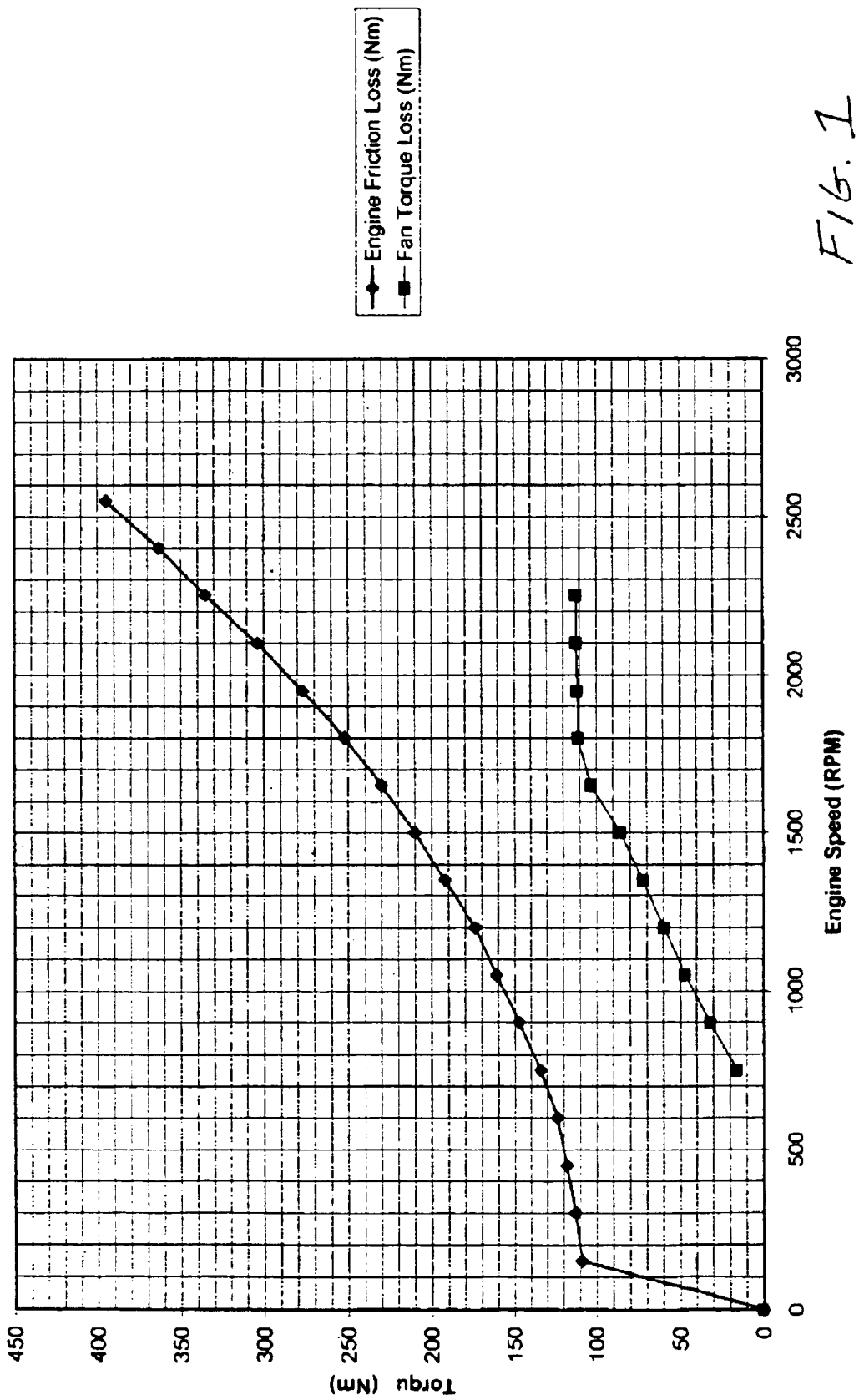
FIG. 1 is a graph illustrating engine friction and fan torque losses as a function of engine speed.

Referring to FIG. 1, a graph illustrating engine friction and fan torque losses as a function of engine speed is shown. The fan coupled to an engine can typically account for about ¼ of the friction losses of an engine if the engine torque loss caused by the fan is considered to be part of the friction loss. As shown in FIG. 1, the fan torque loss is approximately ⅓ of the engine friction loss. The fan torque loss on an engine can be significant. If the engine fan losses can be properly monitored and controlled, engine efficiency may be improved.

Figure 2:
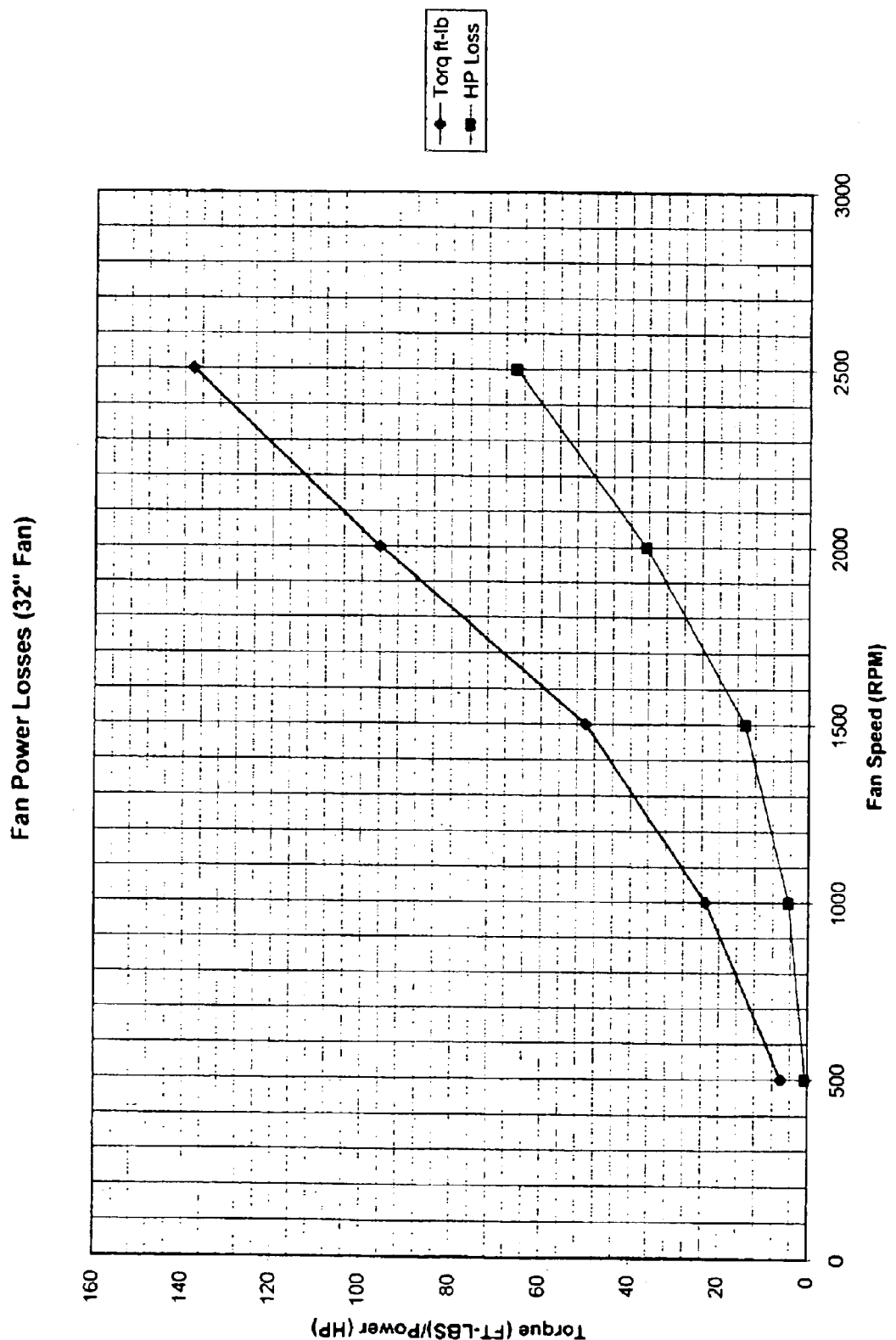
FIG. 2 is a graph illustrating fan power losses of an engine as a function of the fan speed.

Referring to FIG. 2, a graph is shown illustrating engine fan torque and power loss as a function of fan speed. Generally, as the fan speed increases, the resulting power losses on the engine increase and become substantial.

Figure 3:
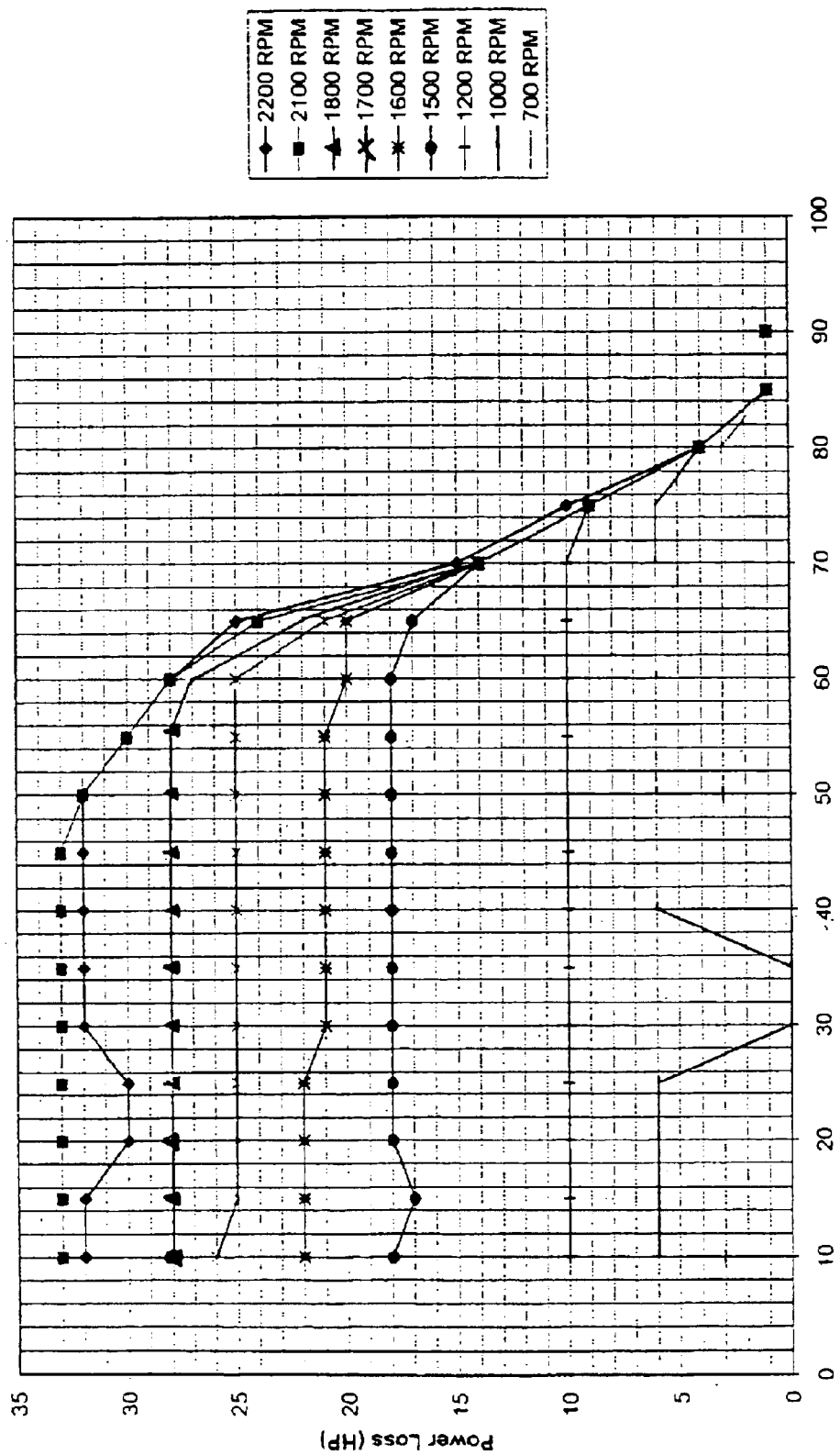
FIG. 3 is a graph illustrating the fan power losses of an engine as a function of fan duty cycle and engine speed.

Referring to FIG. 3, power loss of an engine resulting from fan operation is shown as a function of the duty cycle of the fan. The percentages of duty cycle on the horizontal axis of FIG. 3 represent the percentage duty cycle off (e.g., 80% duty cycle means that the fan is off 80% of the time). Several lines are shown illustrating the losses at various engine speeds. FIG. 3 illustrates that the losses vary when variable speed fans are employed. As shown by FIGS. 1–3, it is necessary to develop a method of estimating power loss of an engine caused by the fan that takes all the variables of FIGS. 1–3 into account if the method is to provide an accurate estimate of the losses caused by the engine fan at a given moment in time.

One embodiment of the invention is based on a method that is used to estimate engine torque losses as a result of fan operation. A one-dimensional table is compiled to store a number of values of maximum fan torque loss versus engine speed. As illustrated in FIGS. 1–3, the ultimate loss values vary depending on the mode of fan operation. Therefore, only maximum values of losses due to fan operation are stored in the table. The method later adjusts the maximum values to obtain an accurate estimate of actual engine torque losses based on engine and fan operation. A table of values is used rather than performing calculations based on a single maximum value since the table provides greater flexibility and increased accuracy for systems that have controls in which the fan power loss is not parabolic (e.g., fan control systems that have hydraulic variable displacement pumps and hydraulic fixed pumps that "spill" the excess pressure at higher engine speeds). The method of the present invention indicates no torque loss when the fan is not operating.

Figure 4:
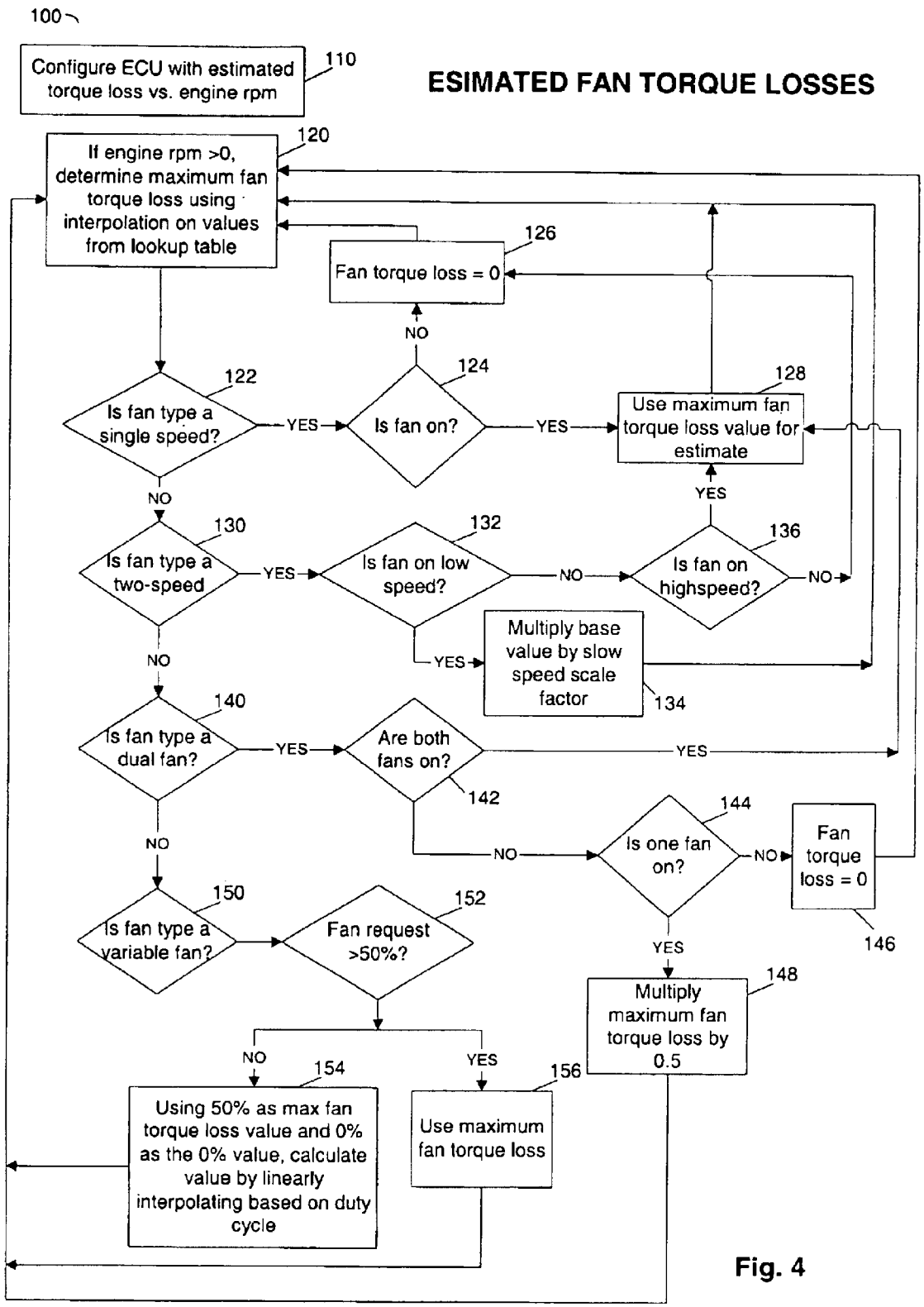
FIG. 4 is a flowchart illustrating a method of estimating engine cooling fan power losses in accordance with a preferred embodiment of the present invention.

Referring to FIG. 4, a flow chart is shown illustrating a method 100 of estimating engine cooling fan power losses in accordance with a preferred embodiment of the present invention. The method 100 begins at a precursor step 110. During the design of the engine cooling system an engine control unit (ECU) is configured with the one-dimensional table (e.g., a lookup table) containing a number of values of estimated torque losses at various engine speeds. Typically, this table is experimentally determined and is stored in the ECU as a look-up table. Beginning by fetching values from this look-up table, the ECU will estimate the fan torque loss of the engine based on the type of fan and the operating conditions of the fan at any given instant in time. Once the precursor step 110 has been completed, the process or method 100 can be exercised. Starting at a step 120, if the engine speed (e.g., rpm) is greater than zero, an estimate of a maximum fan torque loss can be determined from the look-up table by interpolating between the given values. The ECU addresses the look-up table to retrieve the stored values of engine speed closest to each side of the given engine speed (e.g., for an engine speed of 1425 rpm, the ECU may retrieve the values for 1350 rpm and 1500 rpm). From here the maximum fan torque loss will be estimated using interpolation. Once the maximum fan torque loss has been estimated, this value can be adjusted according to the type of fan being used on the engine and the current mode of fan operation.

At a step 122, the method 100 determines if the fan is a single speed fan. If the fan is a single speed fan, the method 100 determines whether or not the fan is operating at a step 124. If the fan is not operating, an engine torque loss estimate is set to zero at a step 126. If the fan is operating, the maximum fan torque loss is used as the engine torque loss estimate at a step 128. The process repeats itself beginning at the step 120. If it was determined at the step 122 that the fan is not a single speed fan, the method progresses to a step 130.

At the step 130, the controller checks to see if the fan type is a two speed fan. If the fan is a two speed fan, the method progresses to a step 132 where the fan is checked to see if it is operating at low speed. If the fan is found to be operating at low speed, the maximum fan torque loss is multiplied by a base value slow speed scale factor at a step 134 to determine the engine torque loss estimate. The method then repeats itself beginning at the step 120. If the fan was not determined to be operating at low speed at the step 132, the method 100 progresses to a step 136 where the fan is checked to see if it is operating at high speed. If the fan is not found to be operating at high speed, the method 100 progresses to the step 126 where the engine torque loss estimate is set to zero. If the fan is found to be operating at high speed at the step 136, the maximum fan torque loss is used as the engine torque loss estimate and the process 100 repeats itself starting at the step 120. If the fan was not found to be a two speed fan at the step 130, the method 100 progresses to a step 140.

At the step 140, the fan is checked to see if it is a dual type fan. If the fan is found to be a dual fan, the method 100 progresses to a step 142 where the fan is checked to see if both fans are operating. If both fans are found to be operating, the maximum fan torque loss is used as the engine torque loss estimate at the step 128 and the process repeats itself beginning at the step 120. If both fans are found not to be, operating at the step 142, the method 100 progresses to a step 144 where it is determined if one of the two fans is operating. If at least one of the fans is not operating, the method 100 progresses to a step 146 where the engine torque loss estimate is set to zero. The method 100 then repeats itself beginning at the step 120. If it is determined at the step 144 that one fan is operating, the engine torque loss estimate is set by multiplying the maximum fan torque loss by a scale value at a step 148. In one example, the scale value may be 0.5, assuming that the two fans are virtually identical. However, the adjustable scale value may be calibrated depending on the particular vehicle fan system configuration (e.g., one fan may be larger than the other). The process 100 then repeats itself beginning at the step 120. If it was determined at the step 140 that the fan type is not a dual fan, the method progresses to a step 150.

At the step 150, the fan is checked to see if it is a variable fan. By process of elimination, if the fan was not a single speed fan or a two speed fan or a dual speed fan, the fan must be a variable fan. Next, the method 100 progresses to a step 152 where a fan request signal is checked to see if a duty cycle greater than 50% is currently being requested. If the current duty cycle of the fan is below 50%, the method progresses to a step 154. At the step 154, 50% of the maximum fan torque loss is used as a practical maximum value since the maximum fan torque loss is reached at 50% duty cycle, as illustrated in FIG. 3. (It is important to note that FIG. 3 represents the reverse condition, where the horizontal axis represents the % duty cycle off) From here, the engine torque loss estimate is determined by interpolating between the practical maximum value and zero based on the duty cycle of the fan (e.g., if the fan duty cycle is 30% and a maximum fan torque loss is 10% estimated fan torque loss, then the engine torque loss estimate would be: [actual fan duty cycle/max fan duty cycle*maximum fan torque loss=[30/50]*10=6%]). If the duty cycle of the fan is 0%, the engine torque loss estimate would be set to zero at the step 154. The method 100 then repeats itself beginning at the step 120. If it is determined at the step 152 that the current duty cycle of the fan is above 50%, the method 100 progresses to a step 156. At 156, the engine torque loss estimate is set at the maximum fan torque loss and the method repeats itself beginning at the step 120. While 50% is used as an example maximum duty cycle, the maximum duty cycle of the variable fan may be any value depending on the design criteria of a particular application.

The method of the present invention is typically implemented in the ECU. The ECU may be connected to an electronic bus implemented in a vehicle. In one example, the electronic bus may be a digital communication link. In one example, the digital communication link may be a SAE J1939 digital communication link. The fan may also be connected to the digital communication link and the fan may communicate with the ECU over the digital communication link. Alternatively, the fan may be wired directly to ECU inputs and/or outputs and the ECU may broadcast the fan torque loss estimate to other electronic components in the vehicle control system over the digital communication link. While the method 100 has been described as being implemented in an automotive ECU, the method 100 may be implemented in any type of microprocessor or controller to meet the design requirements of a particular application.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of estimating engine torque loss due to a fan comprising the steps of:
  compiling a table of maximum fan torque losses at a plurality of engine speeds;
  configuring an engine control unit (ECU) with the table of maximum fan torque losses;
  retrieving from the table a first maximum fan torque loss and a second maximum fan torque loss for an engine speed;
  interpolating between the first maximum fan torque loss and the second maximum fan torque loss to estimate a maximum fan torque loss for the engine speed; and
  calculating an engine torque loss estimate by adjusting the maximum fan torque loss based on a set of predetermined fan characteristics.

2. The method according to claim 1 wherein adjusting the maximum fan torque loss based on the set of predetermined fan characteristics comprises the steps of:
  determining if the fan is a single speed fan;
  determining if the fan is operating;
  setting the engine torque loss estimate at zero if the fan is not operating; and
  setting the engine torque loss estimate at the maximum fan torque loss if the fan is operating and the fan is a single speed fan.

3. The method according to claim 2 wherein adjusting the maximum fan torque loss based on the set of predetermined fan characteristics further comprises the steps of:
  determining if the fan is a two speed fan;
  determining the operating speed of the fan;
  setting the engine torque loss estimate at zero if the fan is not operating;
  setting the engine torque loss estimate by multiplying the maximum fan torque loss by a speed scale factor if the fan is a two speed fan operating at low speed; and
  setting the engine torque loss estimate at the maximum fan torque loss if the fan is a two speed fan operating at high speed.

4. The method according to claim 3 wherein adjusting the maximum fan torque loss based on the set of predetermined fan characteristics further comprises the steps of:
  determining if the fan is a dual type fan;
  determining how many fans are operating;
  setting the engine torque loss estimate at zero if both fans are not operating;
  setting the engine torque loss estimate by multiplying the maximum fan torque loss by an adjustable scale factor if the fan is a dual fan and only one fan is operating; and
  setting the engine torque loss estimate at the maximum fan torque loss if the fan is a dual fan with both fans operating.

5. The method according to claim 4 wherein each of the dual fans are the same and the adjustable scale factor is 0.5.

6. The method according to claim 4 wherein adjusting the maximum fan torque loss based on the set of predetermined fan characteristics further comprises the steps of:
  determining if the fan is a variable speed fan;
  setting the engine torque loss estimate at zero if the fan is not operating;
  determining if the fan is operating at or above a maximum duty cycle;
  multiplying the maximum fan torque loss by a ratio of an actual fan duty cycle compared to the maximum fan duty cycle if the fan type is a variable fan and the fan is operating at less than the maximum duty cycle; and
  setting the engine torque loss estimate at the maximum fan torque loss if the fan is a variable speed fan operating at or above the maximum duty cycle.

7. The method according to claim 6 wherein the maximum duty cycle is 50% duty cycle.

8. The method according to claim 1 wherein the engine torque loss estimate is reported on a digital communication link in a vehicle, the engine control unit optimally adjusting the operation of the fan according to operating conditions of the engine and the engine torque loss estimate.

9. A system for estimating engine torque loss due to a fan comprising:

an engine control unit (ECU);

a digital communication link connected to the engine control unit; and a fan connected to the digital communication link;

wherein the ECU calculates a maximum fan torque loss by interpolating between a plurality of maximum fan torque loss values based on engine speed stored in a table in the ECU; the maximum fan torque loss being adjusted to obtain a fan torque loss estimate based on a set of predetermined fan characteristics.

10. The system according to claim 9 wherein the set of predetermined fan characteristics comprise whether the fan is a single speed fan, a two speed fan, a variable speed fan, and a dual fan.

11. The system according to claim 9 wherein the set of predetermined fan characteristics comprise the type of fan used and the operating speed of the fan.

12. The system according to claim 9 wherein the digital communication link comprises a SAE J1939 digital communication link.

* * * * *